United States Patent [19]

Rasmusson

[11] Patent Number: 5,540,216
[45] Date of Patent: Jul. 30, 1996

[54] APPARATUS AND METHOD FOR CONCENTRATING RADIANT ENERGY EMANATED BY A MOVING ENERGY SOURCE

[76] Inventor: James K. Rasmusson, 421 E. 24th St., Holland, Mich. 49423

[21] Appl. No.: 343,001

[22] Filed: Nov. 21, 1994

[51] Int. Cl.$^6$ .................................................. F24J 2/10
[52] U.S. Cl. .............................. 126/683; 126/685; 362/32
[58] Field of Search .................................... 126/685, 683; 362/32

[56] References Cited

U.S. PATENT DOCUMENTS

| | | |
|---|---|---|
| 1,683,266 | 9/1928 | Shipman .................................. 126/683 |
| 4,000,733 | 1/1977 | Pauly . |
| 4,130,109 | 12/1978 | Brueck . |
| 4,229,184 | 10/1980 | Gregg . |
| 4,266,179 | 5/1981 | Hamm, Jr. . |
| 4,411,490 | 10/1983 | Daniel . |
| 4,444,468 | 4/1984 | Mori . |
| 4,509,501 | 4/1985 | Hunter . |
| 4,527,544 | 7/1985 | Wolf et al. . |
| 4,561,424 | 12/1985 | Gill et al. . |
| 4,612,913 | 9/1986 | Mori . |
| 4,682,582 | 7/1987 | Zsida . |
| 5,010,873 | 4/1991 | Hoyle . |

OTHER PUBLICATIONS

Irvin D. Gluck, *It's All Done With Mirrors*, Doubleday 1968, p. 7.
*Popular Science*, Jun. 1979, pp. 82,83 and 95.
*Popular Science*, Jun. 1992, pp. 95–99.

Primary Examiner—Carroll B. Dority
Attorney, Agent, or Firm—Andrew R. Basile

[57] ABSTRACT

A device efficiently collects energy from a moving source without having to actively track the source. The device includes a primary concentrator, a secondary reflector and a target position. The primary concentrator is positioned to receive energy from the moving energy source and to direct the energy toward the secondary reflector. The secondary reflector has a concave surface which is covered by a number of convex reflecting surfaces. These convex reflecting surfaces direct the energy toward the target position regardless of the relative angle between the energy source and the primary concentrator.

22 Claims, 7 Drawing Sheets

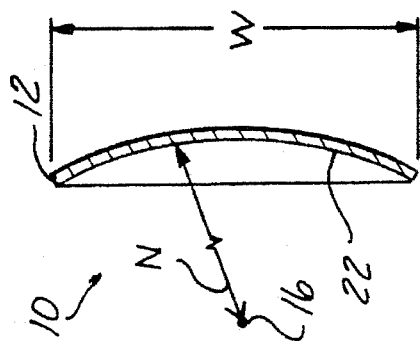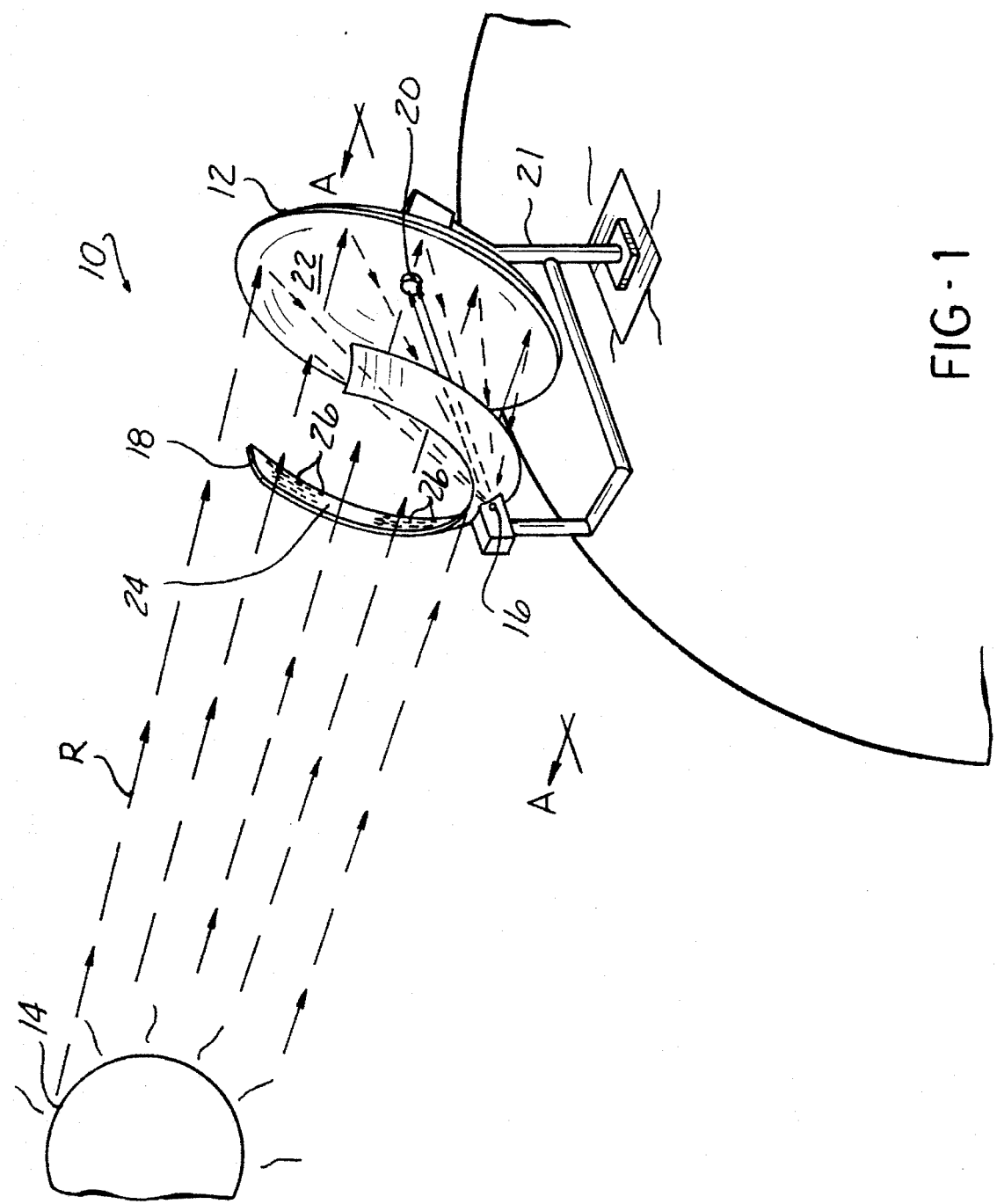

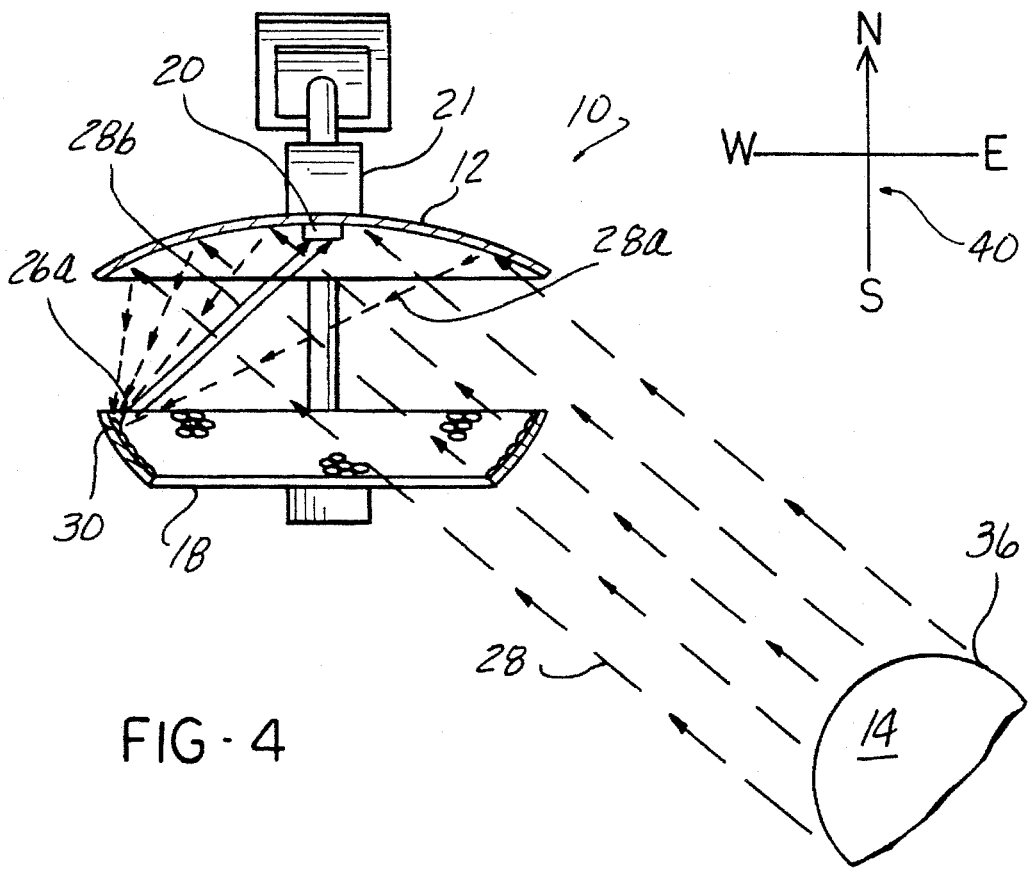
FIG·4
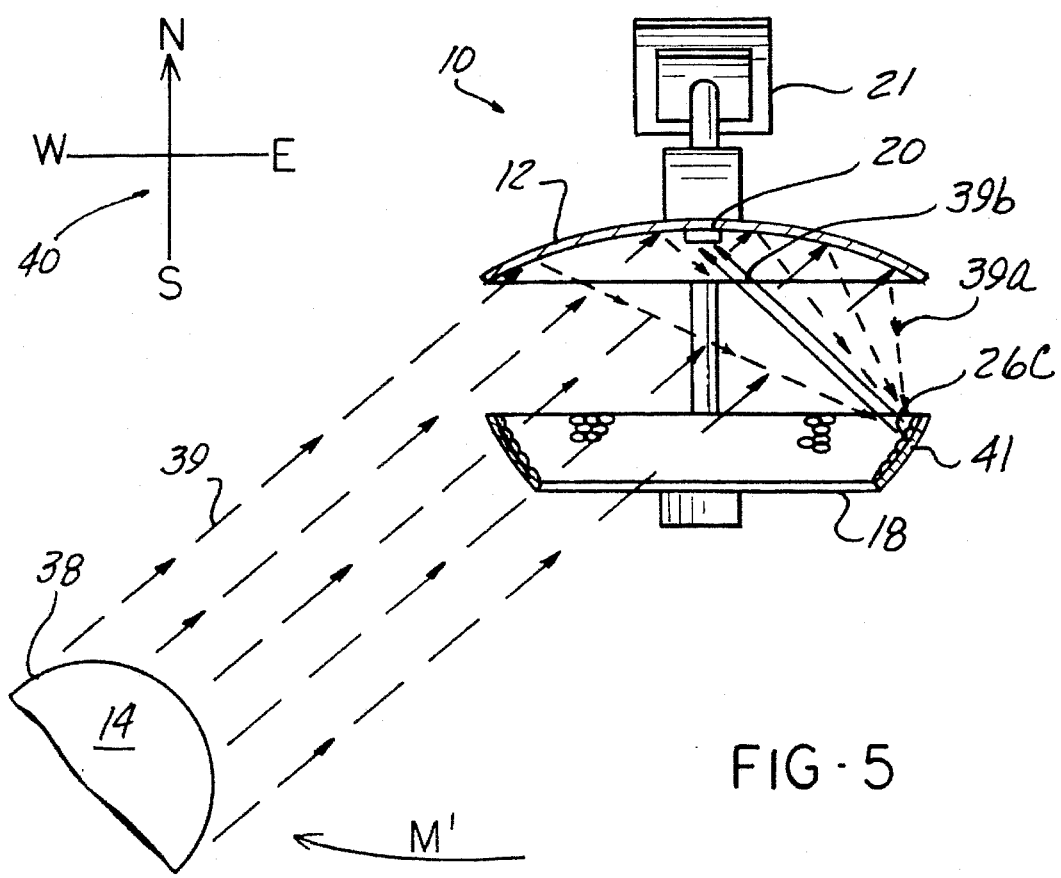
FIG·5

5,540,216

APPARATUS AND METHOD FOR CONCENTRATING RADIANT ENERGY EMANATED BY A MOVING ENERGY SOURCE

FIELD OF THE INVENTION

The present invention relates generally to concentrators such as solar collectors, and specifically to passive nontracking systems which collect energy from moving sources.

BACKGROUND OF THE INVENTION

Energy emitted in the form of waves or particles is referred to as radiation. A common type of radiation is electromagnetic radiation, such as light and radio. There are many natural and human-made sources of radiation, the most important of which is the sun. It is often desirable to gather or "concentrate" the radiation emitted by these sources. For example, a solar collector concentrates the sun's light energy to create intense light or heat. Similarly, a television satellite dish concentrates the radio waves emitted by a communications satellite to improve reception.

A common technique for concentrating radiant energy is to focus the energy on a target position with a lens or curved mirror, such as a concave reflector. The problem with this and similar techniques is that the sources of radiant energy are often moving relative to the mirror. For example, as the sun travels across the sky, its position changes relative to a mirror located on the earth. Thus, it has been necessary to provide tracking systems, which move the mirror to track or follow the sun or other moving source of energy.

Typically, these tracking systems use light or heat sensors in combination with motors. The sensors detect in which direction the sun or other energy source is, and the motors position the concentrator. Such tracking systems require elaborate and costly sensing equipment.

Without a tracking system, it is difficult to keep the energy focused on the desired target position. As the energy source moves relative to the concentrator, a significant portion of the radiated energy is lost. There have been attempts to develop passive non-tracking systems. The drawback to these systems, however, is that at any given time, only a small portion of their energy-collecting capability can be used. As a result of this inefficiency, a significant portion of the radiated energy received by the concentrator is lost.

SUMMARY OF THE INVENTION

The present invention is a device which efficiently collects energy from a moving source without having to actively track the source. The device includes a primary concentrator, a secondary reflector, and a target. The primary concentrator is positioned to receive energy from the moving energy source and to direct the energy toward a nodal point, where energy concentration is greatest. The secondary reflector is located at or near the nodal point, and has a concave surface which faces the primary concentrator and redirects energy from the concentrator to the target.

The secondary reflector's concave surface is covered with a large number of convex reflecting surfaces. These convex reflecting surfaces direct the energy toward the target regardless of the relative angle between the energy source and the primary concentrator. Thus, the apparatus effectively gathers the radiant energy without having to track the moving source.

In one embodiment, the apparatus is used to collect sunlight. The primary concentrator is a concave spherical mirror generally oriented toward the sky. The secondary reflector is positioned with its concave surface facing toward the primary concentrator. Light from the sun strikes the primary concentrator, and is directed toward the concave surface of the secondary reflector. As the sun moves across the sky, the primary concentrator focuses its light on a different part of the secondary reflector. However, because the secondary reflector is covered with numerous convex reflecting surfaces, the light is redirected toward the target—regardless of the angle between the sun and the primary concentrator.

Thus, the apparatus of the present invention can be used to efficiently gather the sun's light throughout the day and without the necessity of moving the primary concentrator to track the sun. Moreover, substantially all the light gathered by the primary concentrator is directed by at least one of the convex surfaces toward the target.

Another embodiment is also useful for collecting sunlight, and includes a conical housing that is open at its tapered end. The secondary concentrator is placed inside the conical housing, opposite from but facing toward the open, tapered end. The primary concentrator—in this case, a fresnel lens—is placed over the open, tapered end to seal the interior of the conical housing. Because the interior of the housing is sealed, the secondary reflector is protected from dirt, water and other elements.

Sunlight collected in accordance with the present invention can be used to provide light and heat. In one application, the apparatus includes a light conducting medium (such as a fiber optic cable), and a light diffuser. The receiving end of the fiber optic cable is placed near the target position. The apparatus is then placed outside a building so that sunlight is directed to the receiving end of the cable. The light is transmitted by the cable or mirrors to the diffuser, which is located inside the building. Thus, the interior of the building can receive sunlight without having energy-dissipating windows.

In another application, the target position includes a portion of pipe. The pipe is part of a circulating system for water or other heat-absorbing fluid. The apparatus concentrates sunlight on the pipe portion to heat the water contained therein. The heated water is then circulated to a holding tank for future use. Alternatively, the heated water could be circulated to heat the interior of a building, for example.

BRIEF DESCRIPTION OF THE DRAWINGS

FIG. 1 is a perspective view of an apparatus for collecting energy in accordance with a first embodiment of the present invention;

FIG. 1A is a cross-sectional view of primary concentrator of FIG. 1 taken along the lines A—A;

FIG. 4 is a top sectional view of the apparatus of FIG. 2, taken along the lines 4—4, and showing the path of sunlight at morning;

FIG. 5 is a top sectional view of the apparatus of FIG. 3, taken along the lines 5—5, showing the path of sunlight at late afternoon;

DETAILED DESCRIPTION OF THE PREFERRED EMBODIMENTS

Figure 2:
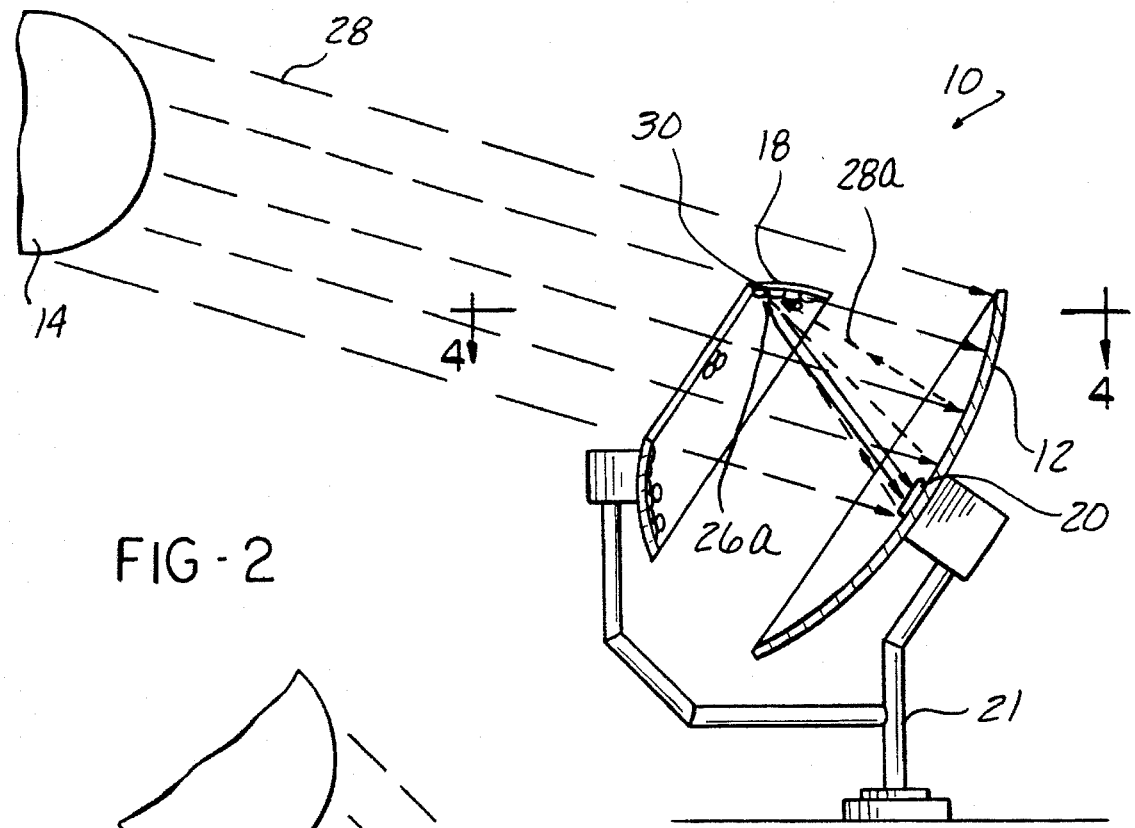
FIG. 2 is a cross-sectional view of the apparatus of FIG. 1 taken along the lines A—A, and showing collection of sunlight in the morning.

FIG. 1 is a perspective view of an apparatus 10 for collecting energy in accordance with the present invention. Apparatus 10 includes a primary concentrator 12 which is positioned to receive radiant energy R from a moving energy source 14 (such as the sun) and to concentrate and direct that energy to a nodal point 16. Apparatus 10 also includes a secondary reflector 18 which is positioned near the nodal point 16 to receive concentrated energy reflected by primary concentrator 12. Secondary reflector 18 redirects concentrated energy to a target position 20, where the energy can be used, such as, for example, to generate light or heat. Primary concentrator 12 and secondary reflector 18 are mounted in fixed relationship to each other by frame 21, which is discussed below.

Target position 20 should be adapted to absorb whatever type of energy apparatus 10 is used to collect. For example, when apparatus 10 is used to collect solar energy, target position 20 is preferably black-painted copper. Alternatively, gold, silver or other material having a high level of heat conductance may be used. When apparatus 10 is used to collect microwaves, for example, target position 20 should be of a material suitable for absorbing microwaves. Target position 20 should be convex, with a spherical contour.

Nodal point 16 is located a nodal distance N from primary concentrator 12, and is the point where energy is most concentrated and incoherent. In practice, nodal point 16 is not a true point, but is rather a small planar portion, the diameter of which depends on the size and focusing power of primary concentrator 12. By comparison, the focal point (particularly when dealing with light) is where energy is resolved on a focal plane. Nodal point 16 is by definition distance N from primary concentrator 12, but varies in location depending on the angle between energy source 14 and primary concentrator 12.

Primary concentrator 12 is a front-reflecting mirror reflector having a concave reflecting surface 22, which has a spherical contour. Alternatively, primary concentrator 12 could have a parabolic contour. As best seen in FIG. 1A, primary concentrator 12 is dish-shaped, and has a width W of 46". Primary concentrator 12 has a spherical radius of curvature equal to nodal length N, as is generally the case with spherical reflectors. In this case, N is 40". In selecting values for N and W, there are at least two considerations. First, concentrator 12, and thus W, should be as large as practicable to gather as much energy as possible. Second, the radius of curvature N of concentrator 12 should be of an optimum size relative to width W. If N is too small, then secondary reflector 18 must be positioned so close to primary concentrator 12 that secondary reflector 18 blocks or shadows energy which would otherwise fall on primary concentrator 12. If N is too large, then primary concentrator 12 subscribes too few degrees of arc, thereby limiting the angle of coverage for receiving energy from source 14. Also, the larger N is, the larger secondary reflector 18 must be. Thus, to avoid the additional expense of a large secondary reflector 18, nodal length should be minimized.

These factors favor using a primary concentrator 12 with the largest possible width W and corresponding optimum nodal length/spherical radius N. Thus, the values of N and W must be chosen to balance these competing objectives. The values of the illustrated embodiment have been found through experimentation to produce excellent results.

Secondary reflector 18 also has a concave reflecting surface 24 which faces the concave surface 22 of primary concentrator 12. Concave surface 24 of secondary reflector 18 includes a plurality of convex reflecting surfaces 26. (For clarity, not every convex reflecting surface 26 is indicated by a reference number.) As explained below in greater detail, radiant energy R from energy source 14 strikes primary concentrator 12, which directs the radiant energy to secondary reflector 18. The radiant energy strikes a different portion of secondary reflector 18 depending on the angle formed by moving source 14 and primary concentrator 12. Regardless of which portion of secondary reflector 18 the radiant energy strikes, it is reflected by one or more of the convex reflecting surfaces 26 to target position 20. Thus, the radiant energy from source 14 is concentrated on target 20 even though source 14 is moving relative to primary concentrator 12. With the present invention, there is no need to move primary concentrator 12 so as to track movement of source 14.

Figure 3:
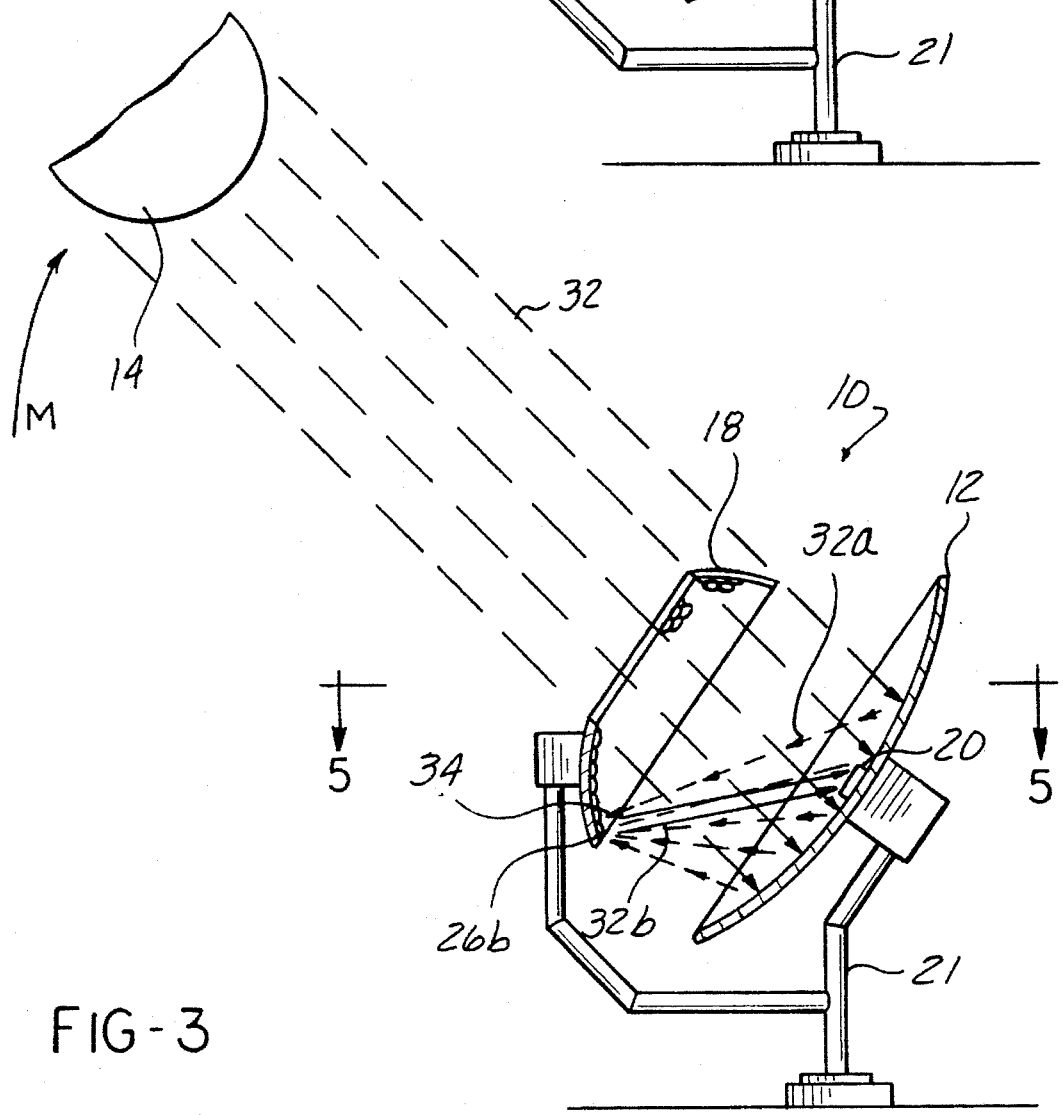
FIG. 3 is the cross-sectional view of FIG. 2 showing collection of sunlight at mid-day.

FIGS. 2–4 more fully illustrate use of apparatus 10 as a solar collector. Referring to FIG. 2, sunlight 28 (represented by parallel lines) in the morning forms a shallow angle relative to the horizon and primary concentrator 12. A cone of morning sunlight 28a reflected off the primary concentrator 12 is concentrated on a nodal point 30 near the upper rim of secondary reflector 18. Convex reflecting surfaces 26a located near point 30 reflect a beam 28b of concentrated sunlight to target position 20, which is a portion of black painted copper. In FIG. 2, cone 28a of concentrated sunlight is represented by dashed lines, and beam 28b is represented by solid lines.

Referring to FIG. 3, as sun 14 moves across the sky in the direction of arrow M, its mid-day light 32 forms a greater angle with the horizon and primary concentrator 12, which is stationary relative to the earth. Thus, a cone 32a of mid-day sunlight reflected off primary concentrator 12 is concentrated to a point 34 near the lower rim of secondary reflector 18. However, convex reflecting surfaces 26b located at point 34 still reflect a beam 32b of concentrated light to at least a portion of target position 20. Effectively, the concentrated light 32b remains directed toward target position 20, despite the fact that neither primary concentrator 12 nor secondary reflector 18 has been moved to track the movement of sun. As in FIG. 2, cone 32a of concentrated sunlight is represented by dashed lines, and beam 32b is represented by solid lines.

The foregoing operation is also shown in FIG. 4, which is a top sectional view of apparatus 10 taken along the lines 4—4 of FIG. 2. Sun 14 is shown in its morning position 36 illustrated in FIG. 2. Morning sunlight 28 strikes primary concentrator 12 from the east and is focused to point 30 on secondary reflector 18. Convex reflecting surface 26a directs beam 28b of concentrated light to target 20.

FIG. 5 is a top sectional view of apparatus 10 taken along the lines 5—5 of FIG. 3, and illustrates the sun 14 in an afternoon position 38. As is understood from every day experience, the afternoon sun has moved in the direction of arrow M' toward the west. Afternoon sunlight 39 strikes primary concentrator 12 from the west and is focused in cone 39a to point 41. Concave reflecting surfaces 26c located near point 41 direct beam 39b of concentrated light to target 20. Although morning and afternoon sunlight 28 and 39 strike secondary reflector 18 in different positions, the convex reflecting surfaces 26 reflect the light to the same point, that is target position 20.

As shown by compass legends 40 in FIGS. 4 and 5, apparatus 10 is oriented so that the concave face of primary concentrator 12 faces due south. Depending on the latitude where the invention is practiced, primary concentrator 12 and secondary reflector 18 should also be cocked at an angle to the horizontal as shown in FIGS. 2 and 3. For example, at the latitude of the 43rd parallel, primary concentrator 12 should form an angle of approximately 35.5° to the surface of the ground. This angle is based on the fact that the sun rises vertically, a maximum 71° above the horizon at the 43rd parallel. Selection of angle to be 35.5° effectively centers primary concentrator 12 on the sun's 71° vertical range.

Figure 6A:
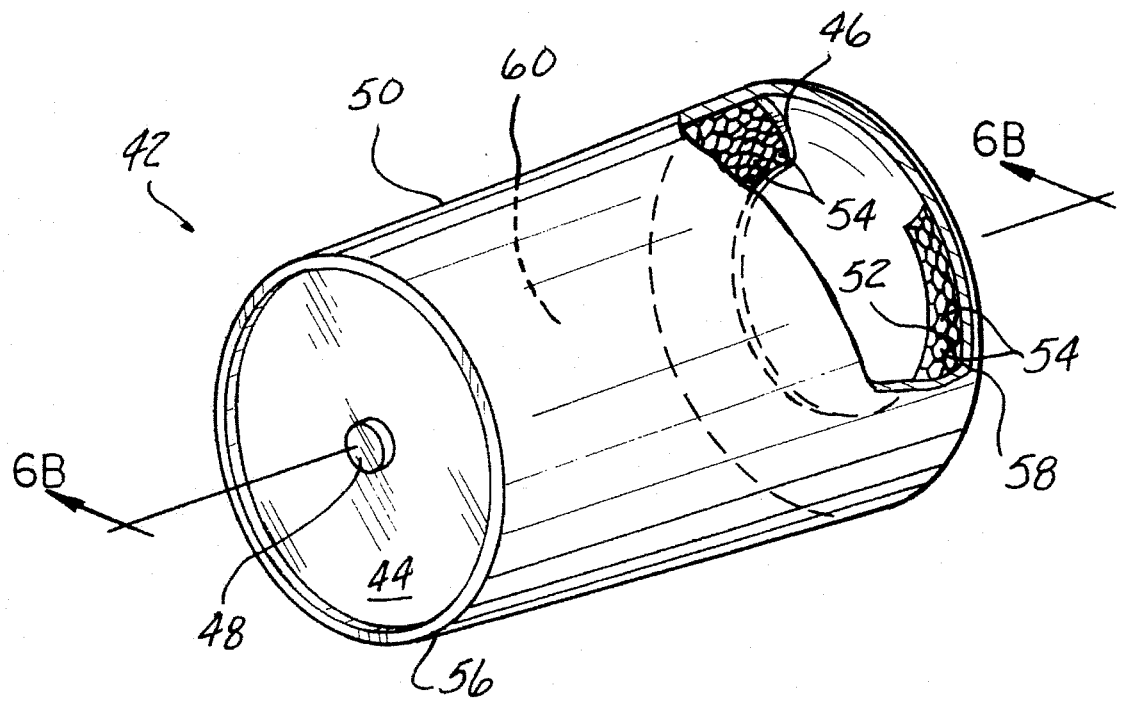
FIG. 6A is a perspective view of an apparatus for collecting energy in accordance with a second embodiment of the invention.
Figure 6B:
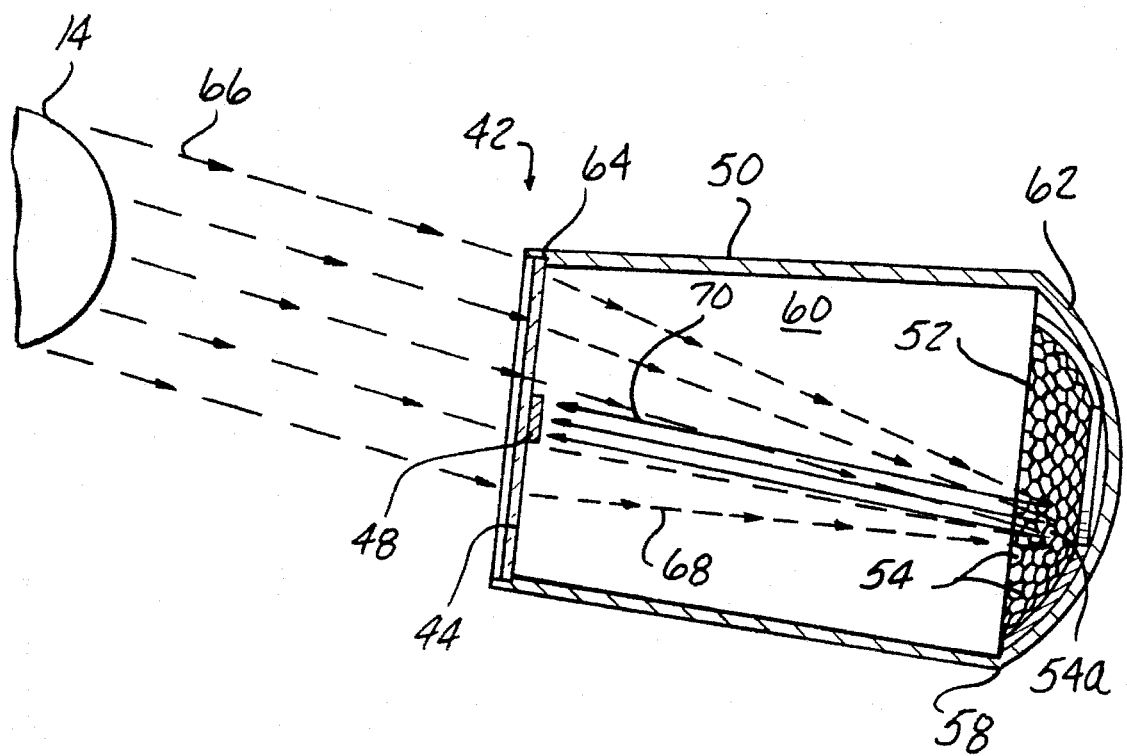
FIG. 6B is a sectional view of the apparatus of FIG. 6A, taken along the lines 6B—6B.

FIGS. 6A and 6B are views of an alternative embodiment 42 of the invention, including a primary concentrator 44, secondary reflector 46, a target position 48, and a conical housing 50. Primary concentrator 44 is a fresnel lens having a nodal length of 40" and a diameter of 46". Secondary reflector 46 has a concave surface 52 having a diameter of 46" and including a large number of convex reflecting elements 54.

Housing 50 includes two longitudinal ends, 56 and 58, spaced about 42" apart and defining an interior chamber 60 therebetween. End 56 is open to accommodate primary concentrator 44, and its diameter may be less than that of end 58. End 58 is sealed by a rounded closure 62, which may be removable for gaining access to interior chamber 60.

As best seen in FIG. 6B, secondary reflector 46 is placed inside conical housing against closure 62 so that its concave surface 52 faces primary concentrator 44. In this manner, convex reflecting elements 54 are located at approximately the nodal length from primary concentrator 44. It will be observed that the curvature of closure 62 accommodates the curvature of secondary reflector 46. However, this is merely a matter of design expediency, and is not essential.

Primary concentrator 44 is placed like a cap over end 56 so that its periphery 64 is in sealing engagement with the inner wall of end 56. With the end 56 of housing 50 sealed by primary concentrator 44, secondary reflector 46 is protected from the elements. This is particularly useful, for example, to prevent rain and dirt from soiling the secondary reflector 46, thereby reducing its effectiveness.

Apparatus 42 collects radiant energy, such as sunlight, in a similar manner to apparatus 10 of FIGS. 2–4. As shown in FIG. 6B, apparatus 42 is oriented generally skyward to receive light 66 from sun 14. Sunlight 66 strikes primary concentrator 44, which directs a cone 68 of concentrated light towards secondary reflector 46. Concentrated light 68 strikes convex reflecting element 54a, which reflects a beam 70 of light to target position 48.

Depending on the angle between sun 14 and the surface of primary concentrator 44, concentrated light 68 strikes different ones of convex reflecting elements 54 which cover concave surface 52 of secondary reflector 46. In accordance with the invention, regardless of which convex reflecting elements 54 are struck by concentrated light 68, beam 70 is reflected to target position 48. Thus, apparatus 42 can collect sunlight at target position 48 without having to actively track the movement of sun 14.

Figure 7A:
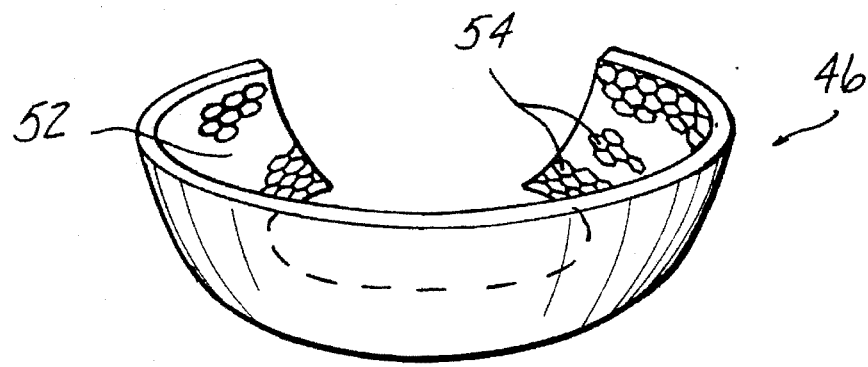
FIG. 7A is a perspective view of a secondary reflector suitable for use in either the first or second embodiments of the invention.
Figure 7B:
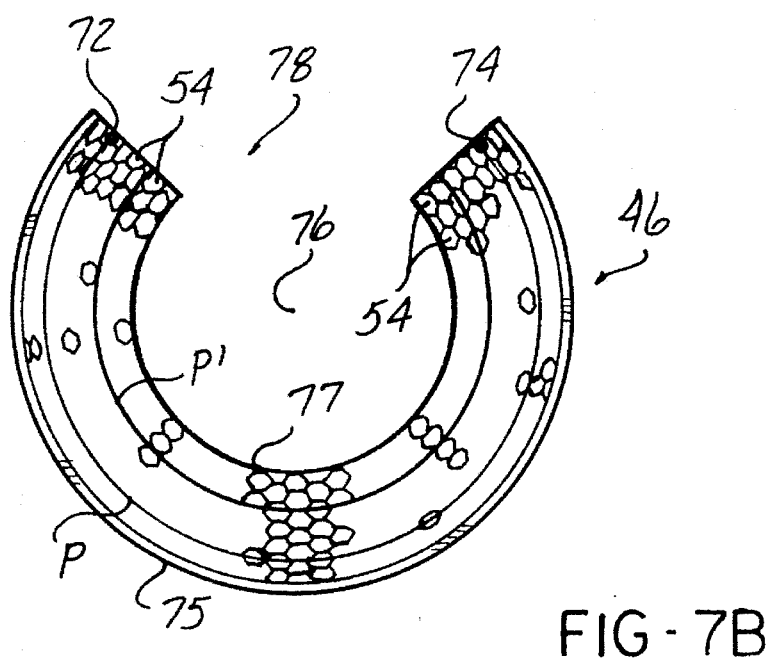
FIG. 7B is a front view of the secondary reflector shown in FIG. 7A.
Figure 7D:
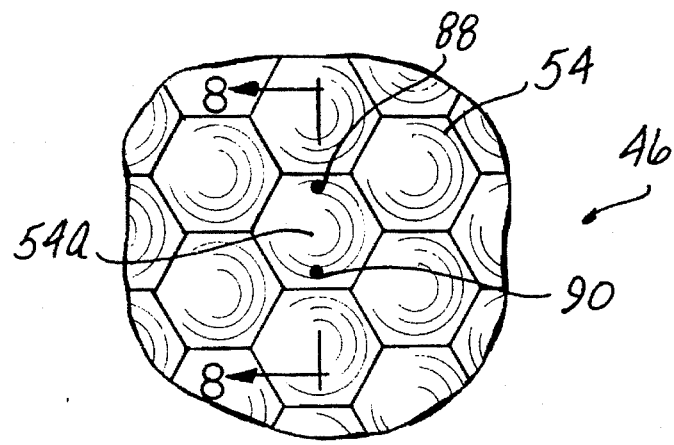
FIG. 7D is an enlargement of the front view of FIG. 7B, showing in greater detail several convex reflecting surfaces.
Figure 7C:
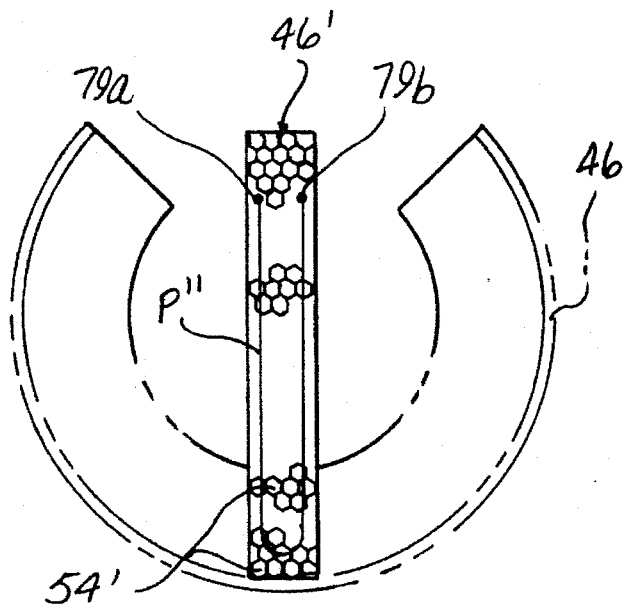
FIG. 7C is an alternative embodiment of the secondary reflector of FIG. 7A.

FIGS. 7A through 7C illustrate in greater detail secondary reflector 46 of FIGS. 6A and 6B. A view of secondary reflector 18 would be substantially identical. As shown in FIGS. 7A and 7B, secondary reflector 46 is a spherical ring sector—a geometric shape also known as truncated spherical zone. Secondary reflector 46 has a spherical radius of curvature equal to the nodal length of primary concentrator 44. As explained above, concave surface 52 is covered with a large number of convex reflecting elements 54. Not every convex reflecting element 54 is illustrated in FIGS. 7A through 7D.

As sun 14 moves both horizontally and vertically relative to primary concentrator 44, cone 68 of concentrated light strikes secondary reflector 46 along a narrow path, such as path P. (This horizontal and vertical movement can be appreciated by comparing the top view of FIGS. 4 and 5 with the side views of FIGS. 2 and 3). At one end of path P is point 72, where light strikes in the morning, and at the other end of path P is point 74, where light strikes in the late afternoon. As the seasons progress, the path along which sunlight 68 strikes secondary reflector 46 shifts to path P'. Ideally, secondary reflector 46 is sized so that the path P of the sun on the summer solstice is inside of the outer edge 75, and path P' of the sun at the winter solstice is just inside of the inner edge 77.

Because sunlight only strikes secondary reflector 46 along certain paths, secondary reflector 46 need not form a complete dish, thus reducing production costs. For example, sunlight would never strike points 76 or 78, and therefore, secondary reflector 46 need not have material in these locations. Hence, secondary reflector 46 is only a spherical ring sector.

FIG. 7D illustrates an alternative embodiment 46' of secondary reflector 46. For purposes of illustration, secondary reflector 46 is shown in phantom lines in FIG. 7C. Secondary reflector 46' is rectangular in shape, and is far more narrow than secondary reflector 46. Otherwise, secondary reflector 46' is constructed like secondary reflector 46 in that it includes a large number of convex reflecting surfaces 54'. Because of its smaller size, secondary reflector 46' is more economical.

Secondary reflector 46' may be used with apparatus 10 or 42 in place of secondary reflector 18 or 46, respectively. When used in apparatus 10, for example, apparatus 10 must be rotated at a rate of once every twenty-four hours. The direction of rotation is clockwise when viewed from above. This rotation maintains primary concentrator 12 generally oriented toward sun 14 (that is, southward) during daylight hours, so that the cone of concentrated light (such as cone 28a of FIGS. 2 and 4) strikes secondary reflector 46', despite its narrow width. Thus, as sun 14 moves across the sky, a cone of concentrated light strikes secondary reflector 46' along a narrow path P" (compared to path P of FIG. 7B), beginning in the morning at point 79a, and terminating in the afternoon at point 79b. Secondary reflector 46' need only be so wide as to accommodate the horizontal variation of path P'' caused by the lack of synchronisity between the sun's sweep across the sky and the rotation of apparatus 10.

To accomplish this rotation, frame 21 is rotatable and motor-driven. Unlike conventional active tracking systems, the mere rotation of frame 21 does not require sensors to detect in which direction sun 14 lies. The rotation simply reduces the required width of secondary reflector 46'. Moreover, the rotation of frame 21 does not involve any effort to track the sun's vertical movement, as in a conventional tracking system. As illustrated in FIG. 7C, the path of light P'' strikes different parts of the secondary reflector, but, in accordance with the invention, is directed to the target position by the plurality of convex reflecting surfaces 54'.

The rotation of frame 21 is a simple and inexpensive mechanical operation which is distinguished from active electronic tracking. The synchronisity between the rotation and the sun's movement can be improved by using elliptical gearing so that the rate of rotation is faster in the mornings and evenings, and slower at noon.

Figure 8:
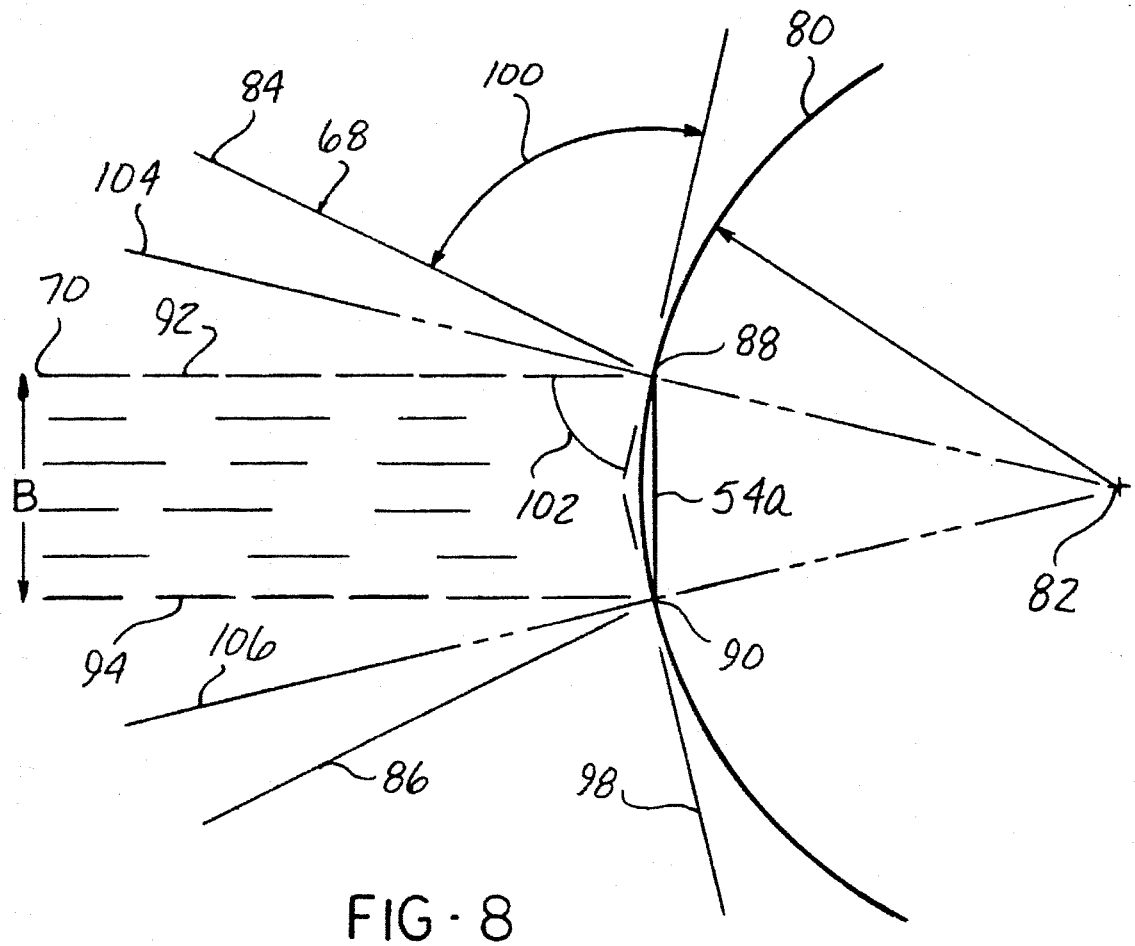
FIG. 8 is a sectional view of one of the convex reflecting surfaces of FIG. 7D, taken along the lines 8—8.

FIGS. 7D and 8 illustrates in greater detail the size, shape and curvature of convex reflecting elements 54. The description of elements 54 in this regard is equally applicable to the elements 26 (of FIGS. 1-4). As shown in FIG. 7D, convex reflecting elements 54 form hexagons of approximately one inch in width. The hexagonal shape provides good structural strength and rigidity, and the one-inch width is selected to match the size of the nodal point of primary concentrator 44.

It may be desirable to have the diameter of reflector elements 54 larger than the diameter of the nodal point because the edges of the convex elements 54 are inherently optically imperfect. That is, they suffer from spherical aberrations. These aberrations cause flaring and scattering of the energy and thus reduce the efficiency of the apparatus. The larger convex element 54 is, the more often concentrated light cone 68 will be away from the edges of element 54, and thus will transmit energy more efficiently. Also, if elements 54 are larger, then fewer of them need be used.

It will be observed in FIG. 8 that beam 70 is of diameter B, equal to the width of element 54. This condition occurs when light beam 70 is redirected to target position 48 as parallel rays. As seen below, this is a function of the selected curvature of element 54. However, it may be desirable to select a smaller radius of curvature so that the light will be further concentrated—or converging—as it moves to the target. Ideally, the beam 70, if converging, should reach its smallest diameter as it strikes target 48.

Thus, target position 48 must be at least as wide as the terminal end 70 to ensure that all of the reflected beam is absorbed by target position 48. A larger convex element 54 will require a larger target position whether or not the light rays of beam 70 are parallel or converging. A large target is undesirable because target position 48 is a blind spot on primary concentrator 44, where light from sun 14 is not gathered. Thus, it is undesirable to have too large a target position, and this factor effectively limits the size of convex reflecting elements 54. The size of convex reflecting elements 54 and target position 48 must be chosen to balance these competing objectives. In the illustrated embodiment, elements 54 are one inch wide, and target position 48 is one inch in diameter. Through experimentation, these values have been found to produce excellent results.

FIG. 8 shows an enlarged cross section of a single convex reflecting element 54a taken along the lines 8—8 of FIG. 7D. The desired curvature of element 54a is illustrated by a dashed arc 80 having a radius of curvature of 2.71 inches about a center reference point 82. Element 54a is shown as a solid line which subscribes a small portion of dashed arc 80. As explained below, the desired curvature is that which causes the light or other energy to be reflected in beam 70 toward target 48. As explained in the following discussion, this desired curvature can be derived geometrically from angles which can be empirically measured.

FIG. 8 shows cone 68 of concentrated light bounded by extreme upper and lower inclined rays 84 and 86, respectively. It is understood that upper and lower rays 84 and 86 are light emanating from diametrically opposed points of primary concentrator 44 (seen best in FIG. 6B). Upper ray 84 strikes point 88 of element 54a, and lower ray 86 strikes point 90 of element 54a. (As shown in FIG. 7D, points 88 and 90 are on opposite sides of element 54a because the width of element 54 is selected to be the same as the width of light cone 68 one nodal length away from primary concentrator 44.)

The curvature of arc 80 at point 88 should be such that light of upper ray 84 is reflected off element 54a to define upper edge 92 of beam 70. Likewise, the curvature of arc 80 at point 90 should be such that light from lower ray 86 is reflected off element 54a to define lower edge 94 of beam 70. It will be appreciated that light from cone 68 which is intermediate upper ray 84 and lower ray 86 is cast within the confines of upper edge 92 and lower edge 94 of beam 70.

This desired curvature has tangents 96 and 98 at points 88 and 90, respectively. It will be appreciated that angle 100 is the angle of incidence between upper ray 84 and tangent 96, and angle 102 is the angle of reflection between upper beam edge 92 and tangent 96. As a matter of optics, the angle of incidence 100 equals the angle of reflection. It follows, then, as a matter of geometry, that tangent 96 must be normal to a line 104 which bisects the angle between upper ray 84 and upper edge 92. By definition, then, bisection 104 lies on a radial line of desired arc 80.

This is equally true for line 106, which bisects the angle between lower ray 86 and lower edge 94. The center point 82 of desired arc 80 is therefore the intersection of lines 104 and 106, as shown in FIG. 8. Because lines 104 and 106 can be determined through empirical measurement, they can be used to find center point 82, and thereby determine arc 80, and therefore, the desired curvature of element 54a.

Figure 9:
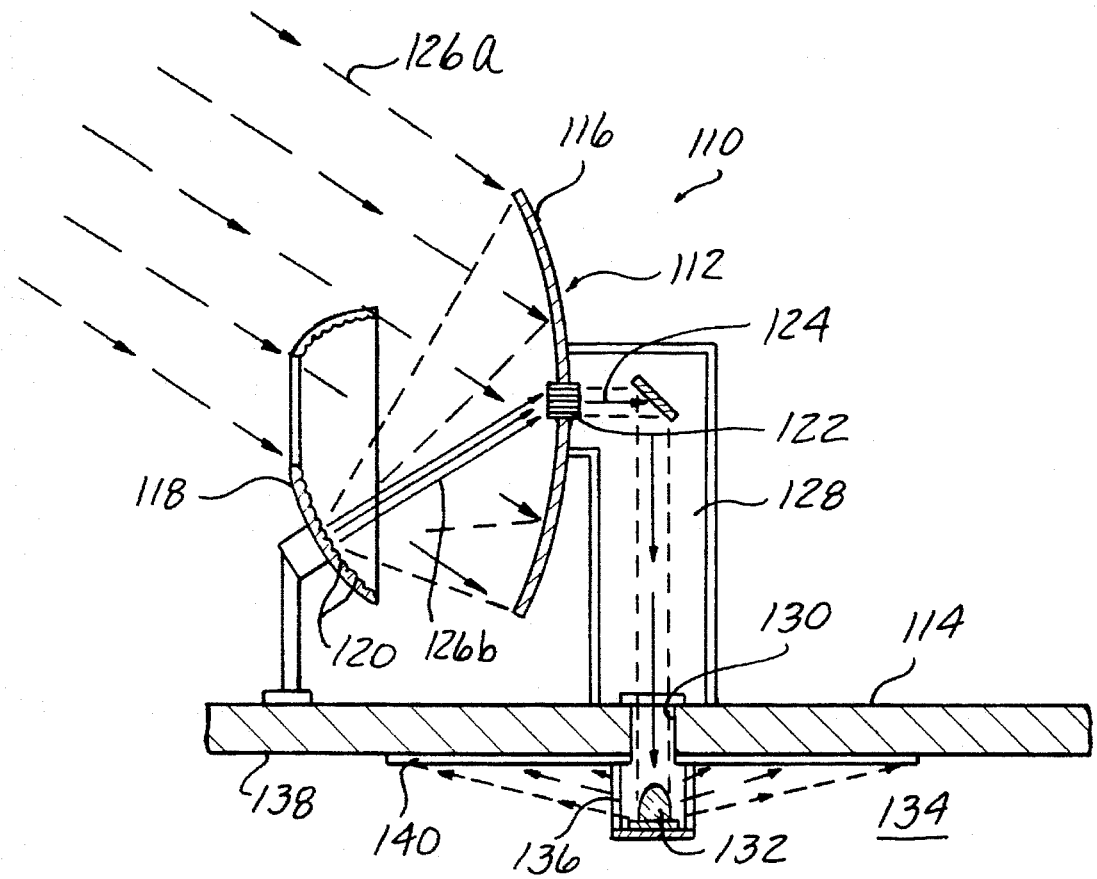
FIG. 9 is a side cross sectional view of a concentrator in accordance with the invention used to provide light inside a building.

The present invention can be used in a variety of applications. For example, FIG. 9 is a side cross sectional view of an apparatus 110 used to provide light. Apparatus 110 includes a concentrator 112 substantially identical to the apparatus 10 of FIG. 1. Apparatus 110 is placed on a roof 114 of a building, and includes a primary concentrator 116, a secondary reflector 118 having a plurality of convex reflecting elements 120, and a target position 122 equipped with a light transmitting medium 124, such as a fiber optic bundle.

Sunlight 126a striking concentrator 112 is concentrated by primary concentrator 116 toward secondary reflector 118, as explained above in connection with FIGS. 1–4. Convex reflecting elements 120 on the surface of secondary reflector 118 reflect a beam of light 126b toward target position 122. Light transmitting medium 124 is disposed at target position 122 to gather incoming beam 126b, and direct it along a channel 128 through a small opening 130 in roof 114. Channel 128 terminates at a diffuser 132 located in the building interior 134. Diffuser 132 is suspended from roof 114 by a suitable frame 136, and reflects light onto a ceiling 138. Ceiling 138 is equipped with a reflective surface 140 located circumjacent to diffuser 132. Light cast by diffuser 132 onto surface 140 is reflected to illuminate the building interior 134. Thus, interior 134 receives the benefit of sunlight without the necessity of energy-dissipating windows.

Figure 10:
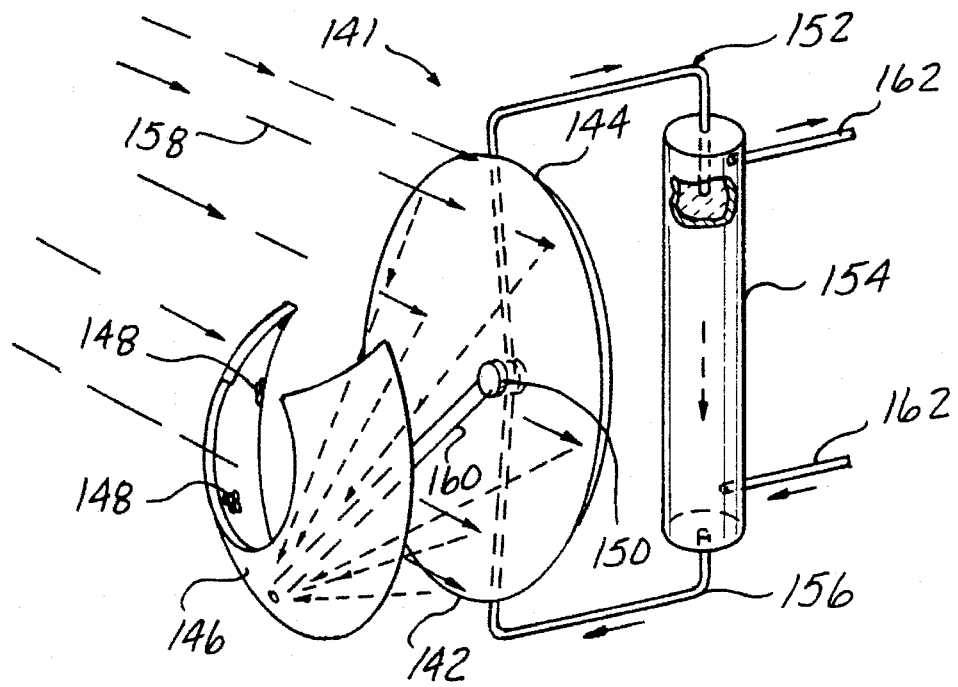
FIG. 10 is a schematic perspective view of a concentrator in accordance with the invention used to provide heat.

Another useful application is the generation of heat. FIG. 10 shows a partial perspective view of an apparatus 141 used to heat water or other fluids. Apparatus 141 includes a concentrator 142 substantially identical to the apparatus 10 of FIG. 1. Concentrator 142 includes a primary concentrator 144, a secondary reflector 146 having a plurality of convex reflecting elements 148, and a target position 150 adopted to receive a portion of a circulating system 152.

Circulating system 152 can include a pump (not shown), a tank 154 for holding a fluid (typically water) and piping 156 allowing the fluid to be pumped from tank 154 past target position 150 and back to tank 154. If used, the pump aids in circulation of fluid, but is not necessary because the system can employ natural convection to circulate the fluid. Sunlight 158 striking apparatus 142 is concentrated by primary concentrator 144 toward secondary reflector 146, as explained above in connection with FIGS. 1–4. Convex reflecting elements 148 on the surface of secondary reflector 146 reflect a beam of light 160 toward target position 150. The concentrated light heats target position 150. Piping 156 is conductively linked with target position 150 so that heat therein is conducted to the fluid in piping 156. Heated fluid can be stored in tank 154, or further circulated by piping 162 for other purposes, such as to heat a building (not shown).

I claim:

1. An apparatus for collecting electromagnetic energy emanated by a moving energy source, comprising:
   a primary concentrator positioned to receive energy from said moving energy source and to direct the energy toward a nodal point;
   a secondary reflector located near said nodal point and having a secondary concave surface facing toward said primary concentrator, said secondary concave surface having a plurality of convex reflecting surfaces positioned to reflect energy received from said primary concentrator toward a predetermined target position;
   wherein said primary concentrator directs energy to different convex reflecting surfaces depending on the position of the moving energy source relative to said primary concentrator.

2. The apparatus of claim 1 wherein said primary concentrator is a reflector having a primary concave reflecting surface.

3. The apparatus of claim 2 wherein said primary concave reflecting surface has a parabolic contour.

4. The apparatus of claim 2 wherein said target position is located on said primary concave reflecting surface.

5. The apparatus of claim 1 wherein said primary concentrator is a lens.

6. The apparatus of claim 5 wherein said lens is a fresnel lens.

7. The apparatus of claim 1 wherein said secondary reflector surface has a radius equal to the distance which the nodal point lies from said primary concentrator.

8. The apparatus of claim 1 wherein at least some of said convex reflecting surfaces are spherical about a radius of curvature of a length selected so that energy directed from the peripheral edges of said primary concentrator to said convex reflecting surface is reflected to said target position.

9. The apparatus of claim 1 wherein at least some of said convex reflecting surfaces are no larger than the diameter of the nodal point.

10. The apparatus of claim 1 wherein said target position comprises a convex absorbing surface and at least some of said convex reflecting surfaces and said target absorbing surface are spherical about radii of equal length.

11. The apparatus of claim 1 wherein said target position includes a convex absorbing surface having a width no larger than the nodal point.

12. A solar collector, comprising:
    a primary concentrator having a primary concave surface generally oriented toward the sky, said primary concentrator suitable for directing sunlight to a nodal point;
    a target position; and
    a secondary reflector having a concave surface facing said primary concave surface, said secondary concave surface having a plurality of convex reflecting surfaces positioned to reflect energy received from said primary concentrator toward said target position.

13. The apparatus of claim 12 wherein said secondary reflector is located approximately at the nodal point of said primary concentrator, and said target position is located near the surface of said primary concentrator.

14. The apparatus of claim 12 wherein at least some of said convex reflecting surfaces are curved about a radius of a length selected so that energy from the peripheral edges of said primary concentrator is directed to said convex reflecting surface is reflected to said target position.

15. The solar collector of claim 12 wherein at least some of said convex reflecting surfaces are approximately the same size as the nodal point.

16. The solar collector of claim 12 wherein said convex surfaces are arranged over said secondary concave surface so that light striking said secondary concave surface from different angles is reflected by said convex surfaces to said target position.

17. A method for concentrating radiant energy from a moving source to a target position, comprising the steps of:
    providing a concentrator suitable for concentrating the energy towards a point;
    placing a concave surface near said point and facing said concentrator so that the radiant energy strikes a different portion of said concave surface depending on the angle between the moving source and said first concentrator; and
    providing a plurality of convex reflecting surfaces on said concave surface, and positioning each convex surface so that it reflects light received from said concentrator toward the target position.

18. The method of claim 17 wherein said convex reflecting surfaces are curved about a radius of a sufficient length so that energy received by said convex reflecting surfaces from the peripheral edges of said primary concentrator is directed to said target position.

19. The method of claim 17 further comprising the step of holding said concentrator and said concave surface stationary relative to each other, and rotating said concentrator and said concave surface relative to the earth at a rate of one revolution per day.

20. The method of claim 17 wherein at least some of said convex reflecting surfaces are spherical about a radius of curvature sufficiently long so that energy directed from the peripheral edges of said primary concentrator to said convex reflecting surface is reflected to said target position.

21. A method for heating a fluid by concentrating radiant energy from a moving source, comprising the steps of:
    providing a concentrator suitable for concentrating the energy towards a nodal point;

placing a concave surface near said nodal point and facing said concentrator so that the radiant energy strikes a different portion of said concave surface depending on the angle between the moving source and said first concentrator;

providing a plurality of convex reflecting surfaces on said concave surface, and positioning each convex surface so that it reflects light received from said concentrator toward a heat-absorbing target position; and placing the fluid to be heated in communication with said heat-absorbing target position so that heat is transferred from said target to the fluid.

22. A method for lighting the interior of a building by concentrating light from the sun, comprising the steps of:

providing a concentrator outside of the building and suitable for concentrating sunlight towards a nodal point;

placing a concave surface near said nodal point and facing said concentrator so that the sunlight strikes a different portion of said concave surface depending on the angle between the sun moving source and said first concentrator;

providing a plurality of convex reflecting surfaces on said concave surface, and positioning each convex surface so that it reflects light received from said concentrator toward a fixed target position; and directing concentrated sunlight from said target position to a point inside the building.

* * * * *